Nov. 13, 1928.　　　　　　　　　　　　　　　　　1,691,590
F. H. SHERRERD
CONCRETE PIPE OR CONDUIT
Filed June 15, 1925
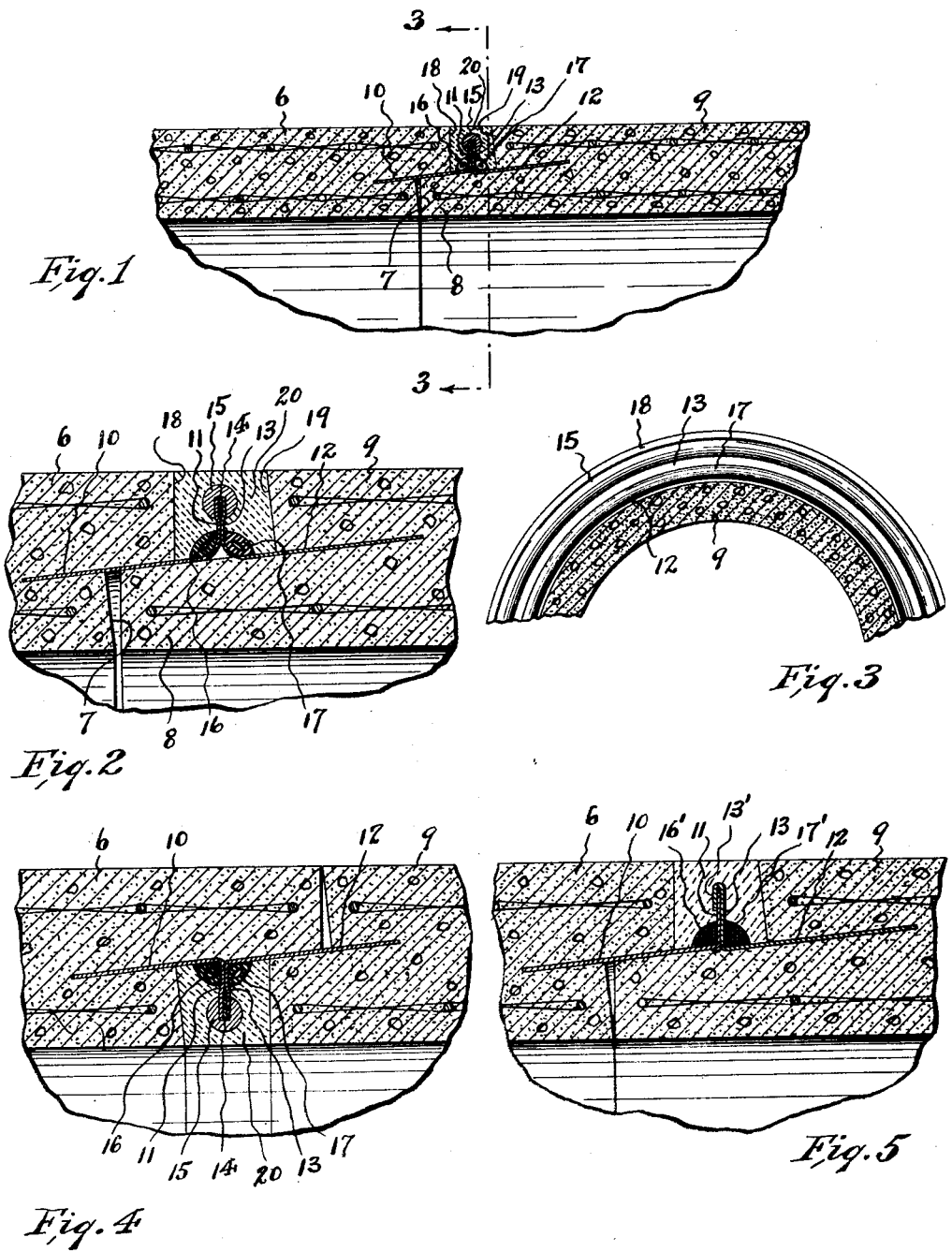
INVENTOR.
Francis H. Sherrerd,
BY
ATTORNEYS.

Patented Nov. 13, 1928.

1,691,590

UNITED STATES PATENT OFFICE.

FRANCIS H. SHERRERD, OF EAST ORANGE, NEW JERSEY, ASSIGNOR TO NEWARK CONCRETE PIPE CO., OF NEWARK, NEW JERSEY, A CORPORATION OF NEW JERSEY.

CONCRETE PIPE OR CONDUIT.

Application filed June 15, 1925. Serial No. 37,166.

This invention relates, generally, to improvements in concrete pipes and conduits, and has reference, more particularly, to an improved construction of leak-proof joint between adjoining ends of the pipe or conduit sections.

In order to provide tight leak-proof joints between adjacent sections of concrete pipe or conduit, whereby expansion and contraction of the latter will not tend to open the joints, it has been heretofore proposed to imbed in the opposed adjoining ends of the pipe or conduit sections sheet metal rings provided with meeting flanges at their outer opposed ends which are joined or interlocked together. In such structures repeated contraction of the pipe or conduit sections tending to separate and expansion tending to move together the adjoining ends thereof exerts a considerable strain on the sheet metal rings, especially at the junctures of the meeting flanges therewith. These strains tend to weaken the metal at such points, with the result that breaks or cracks occur which defeat the purpose of the joint, and permit leaks to occur.

It is the principal object of this invention to provide in connection with said sheet metal joint rings and their meeting flanges, a yieldable cushion member or gasket which is located in the angle of the junctures of the rings and their flanges, whereby, when the strains incident to expansion and contraction occur, a yieldable buffer or cushion is afforded so that the metal is so supported and backed that it will be caused to flex or bend and not stretch with consequent tendency to weakening and ultimate fracture. Said buffer or cushion, while yieldable exerts, by reason of its compression, a counteracting pressure to the strains or stresses put upon the metal rings and their flanges under the pull of the pipe or conduit contraction, so that the metal will be compelled to easily bend around the said buffer or cushion.

The invention is clearly illustrated in the accompanying drawings, in which:—

Figure 1 shows in longitudinal vertical section a portion of adjoining pipe or conduit sections equipped with the novel leak-proof joint made according to and embodying the principles of this invention; and Figure 2 is a similar view, on an enlarged scale, showing the operation of the joint under the pulling strains exerted by contraction of the pipe or conduit sections; and Figure 3 is a fragmentary transverse section, taken on line 3—3 in Figure 1, the grout surrounding the joint being removed.

Figure 4 is a fragmentary longitudinal section of adjoining pipe or conduit units provided with the novel joint structure in the form of an inside joint.

Figure 5 is a fragmentary longitudinal section of adjoining pipe or conduit units provided with a modified form of the novel leak-proof joint structure.

Similar characters of reference are employed in all of the hereinabove described views, to indicate corresponding parts.

Referring to Figures 1, 2 and 3, I have shown my novel construction of leak-proof joint as an outside joint. In this form the pipe or conduit sections or units are molded from concrete or other plastic material. One section or unit 6 is provided with a bell end 7 to receive the spigot end 8 of the adjoining section or unit 9. Imbedded in the bell end 7 of the section or unit 6 is a joint ring 10 made of any, preferably non-corrosive, sheet metal, such, for example, as copper. The outer end portion of said joint ring 10 projects from the body of the section of the unit 6 so as to line or face the interior surface of the bell, and so as to project beyond the outer boundaries of the latter. Said joint ring 10 is provided at its outer or free extremity with an annular meeting flange 11, which extends outwardly substantially at right angles to the longitudinal axis of the pipe or conduit. In a similar manner, there is imbedded in the spigot end of the section or unit 9 a joint ring 12, also made of any, preferably non-corrosive, sheet metal, such, for example as copper. The outer end portion of said joint ring 12 projects from the body of the section or unit 6 so as to line or face the exterior surface of the spigot 8 to a point intermediate the free end and butt of the latter. Said joint ring 12 is also provided at its outer or free extremity with an annular meeting flange 13, which also extends outwardly substantially at right angles to the longitudinal axis of the pipe or conduit.

When the opposed bell and spigot ends of the adjoining pipe or conduit sections 6 and 9 are assembled together, the meeting flanges 11 and 13 of the respective joint rings 10 and 12 are opposed to each other with their free marginal portions abutting one another, and preferably with a soft or compressible gasket 14 inserted therebetween. The abutting marginal portions of said meeting flanges 11 and 13 together with the intermediate gasket 14 are compressed and secured together so as to be retained against accidental separation, and so as to form a tight leak-proof joint, by means of a binding or keeper ring 15, which is internally slotted to embrace and clamp the said parts tightly together.

When the pipe or conduit sections are thus assembled and the joint rings connected at their meeting flanges in the manner above described, an annular cushion or buffer member 16 is laid in the angle formed by the juncture of the joint ring 10 with its meeting flange 11; and a similar annular cushion or buffer member 17 is laid in the angle formed by the juncture of the joint ring 12 with its meeting flange 13. The cushion or buffer members 16 and 17 may be made of any suitable resilient or compressible material. For example, the same may be made of rubber, in either solid or tubular form (as shown in Figures 1 to 4), or they may be made of any relatively elastic or yieldable material of plastic character. A plastic material such as a non-drying asphaltic compound may be employed for the purpose, as shown in Figure 5.

After the cushion or buffer members 16 and 17 have been put in place the space surrounding the completed joint and lying intermediate the external shoulders 18 and 19 of the pipe or conduit sections 6 and 9 is filled with grout or mortar 20 to thereby protect the joint as well as to cover and retain the cushion or buffer members 16 and 17 in proper assembled and cooperative relation to the respective joint rings and their meeting flanges.

As shown in Figure 2, when pulling strains or stresses are exerted on the joint rings 10 and 12 by reason of contraction of the pipe or conduit sections or units, which tend to separate the joint rings and thus spread apart the inner portions of the joined meeting flanges 11 and 13, the cushion or buffer members 16 and 17 will tend to distribute the stress so that the metal at the juncture of the joint rings and their meeting flanges will not be weakened or stretched, but will rather tend to bend and curve about the said cushion or buffer members 16 and 17, the latter being thereby compressed, and by the compression backing the metal with a counter-acting pressure tending to deform the metal without likelihood of producing fractures at the junctures of the joint rings and their meeting flanges.

As shown in Figure 4, the novel joint structure is provided in reversed position so as to produce the same at the inside of the pipe or conduit instead of at the outside thereof. In principle and function the joint in such inside relation is substantially the same as above described, and its structure is also substantially the same as is evidenced by the use of corresponding reference characters to identify the details of construction thereof.

Referring now to Figure 5, I have illustrated a somewhat modified form of my novel leak-proof joint. In this construction I provide the metal joint rings 10 and 12 imbedded respectively in the adjoining ends of the pipe or conduit sections 6 and 9, and the opposed free ends of said joint rings are respectively provided with the abutting annular meeting flanges 11 and 13. Instead of securing the free abutting marginal portions of the meeting flanges 11 and 13 together by means of an intermediate gasket and embracing clamp or keeper ring in the manner above described, I construct one flange of greater extent than the other, for example, the flange 13 is arranged to project beyond the flange 11, and I then turn over the projecting portion of the flange 13 around the marginal portion of the flange 11, thus producing an interlocking bead 13'. The interlocked joint thus formed is united by brazing, soldering, welding or in any other suitable manner to produce a tightly sealed leak-proof joint. In Figure 5 I have shown the buffer or cushion member 16' for the joint ring 10 and the buffer or cushion member 17' for the joint ring 11 as made of an elastic or yieldable plastic material, such for example, as a non-drying asphaltic compound, the same being retained in place by the cement or grout filler 20. It will also be understood that the above described modified form of my novel leak-proof structure may be produced as an inside joint as well as in the form of the outside joint shown in said Figure 5.

From the above description it will be understood that this invention provides a novel leak-proof expansion joint for concrete or similar pipe or conduit, which is not only long lived and efficient, but which is adapted to withstand considerable internal pressure.

Having thus described my invention, I claim:—

1. A leak-proof expansion joint for concrete pipe sections comprising metallic joint rings respectively imbedded in opposed ends of adjoining pipe sections, each joint ring having at its free end a laterally projecting annular meeting flange, said meeting flanges being opposed in abutting relation one to the other, means for uniting and sealing the free marginal edges of said meeting flanges together, said opposed ends of adjoining pipe sections being formed to provide an annular intermediate space into which said joined meeting flanges extend, resilient cushion means disposed in the angle of juncture between each joint ring and its meeting flange, and cementitious material filled into said annular space to cover the joined meeting flanges and said resilient cushion means.

2. A leak-proof expansion joint for concrete pipe sections having cooperating bell and spigot portions at their opposed adjoining ends, metallic joint rings respectively imbedded in said pipe sections and projecting therefrom to face the respective bell and spigot portions thereof, each joint ring having at its free end a laterally projecting annular meeting flange, said meeting flanges being opposed in abutting relation one to the other, means for uniting and sealing the free marginal edges of said meeting flanges together, said opposed ends of adjoining pipe sections being formed to provide an annular intermediate space into which said joined meeting flanges extend, resilient cushion means disposed in the angle of juncture between each joint ring and its meeting flange, and cementitious material filled into said annular space to cover the joined meeting flanges and said resilient cushion means.

3. In a leak-proof expansion joint for concrete pipe the combination with metallic joint rings having opposed and abutting meeting flanges angularly extending from their outer extremities, of means for uniting and sealing together the free edges of said meeting flanges, compressible means entered in the angle of juncture between each joint ring and its meeting flange, and relatively rigid means surrounding and holding said compressible means in place.

In testimony, that I claim the invention set forth above I have hereunto set my hand this 2nd day of April, 1925.

FRANCIS H. SHERRERD.